United States Patent

[11] 3,596,255

| [72] | Inventors | Gilbert A. Reeser<br>Sunnyvale;<br>Gary B. Gordon, Cupertino, both of, Calif. |
|---|---|---|
| [21] | Appl. No. | 840,244 |
| [22] | Filed | July 9, 1969 |
| [45] | Patented | July 27, 1971 |
| [73] | Assignee | Hewlett-Packard Company<br>Palo Alto, Calif. |

[54] DISPLAY BLANKING APPARATUS
3 Claims, 1 Drawing Fig.

| [52] | U.S. Cl. | 340/172.5 |
|---|---|---|
| [51] | Int. Cl. | G06f 3/14 |
| [50] | Field of Search | 340/172.5, 324; 235/157; 324/78 D, 68 C |

[56] References Cited
UNITED STATES PATENTS

| 3,449,726 | 6/1969 | Takuya Kawamota et al. | 340/172.5 |
| 3,537,073 | 10/1970 | Shursuke Sakoda et al. | 340/172.5 |
| 3,213,361 | 10/1965 | Dornberger et al. | 324/78 X |
| 3,263,064 | 7/1966 | Lindars | 324/78 X |
| 3,375,498 | 3/1968 | Scuitto et al. | 340/172.5 |
| 3,388,384 | 6/1968 | Bogert et al. | 340/172.5 |
| 3,405,392 | 10/1968 | Milne et al. | 340/172.5 |
| 3,509,484 | 4/1970 | Basse | 324/78 |

*Primary Examiner*—Gareth D. Shaw
*Assistant Examiner*—Sydney Chirlin
*Attorney*—A. C. Smith

ABSTRACT: The frequency of an unknown signal is displayed as the arithmetic combination of counts taken during a gate period of clock pulses and of pulses of the unknown frequency. The arithmetic combination of the counts typically provides a display quantity to a number of significant digits that exceeds the accuracy with which the counts are taken. Logic circuitry detects and blanks the significant display digits to the right of a decimal point which exceed the basic accuracy of the measurements.

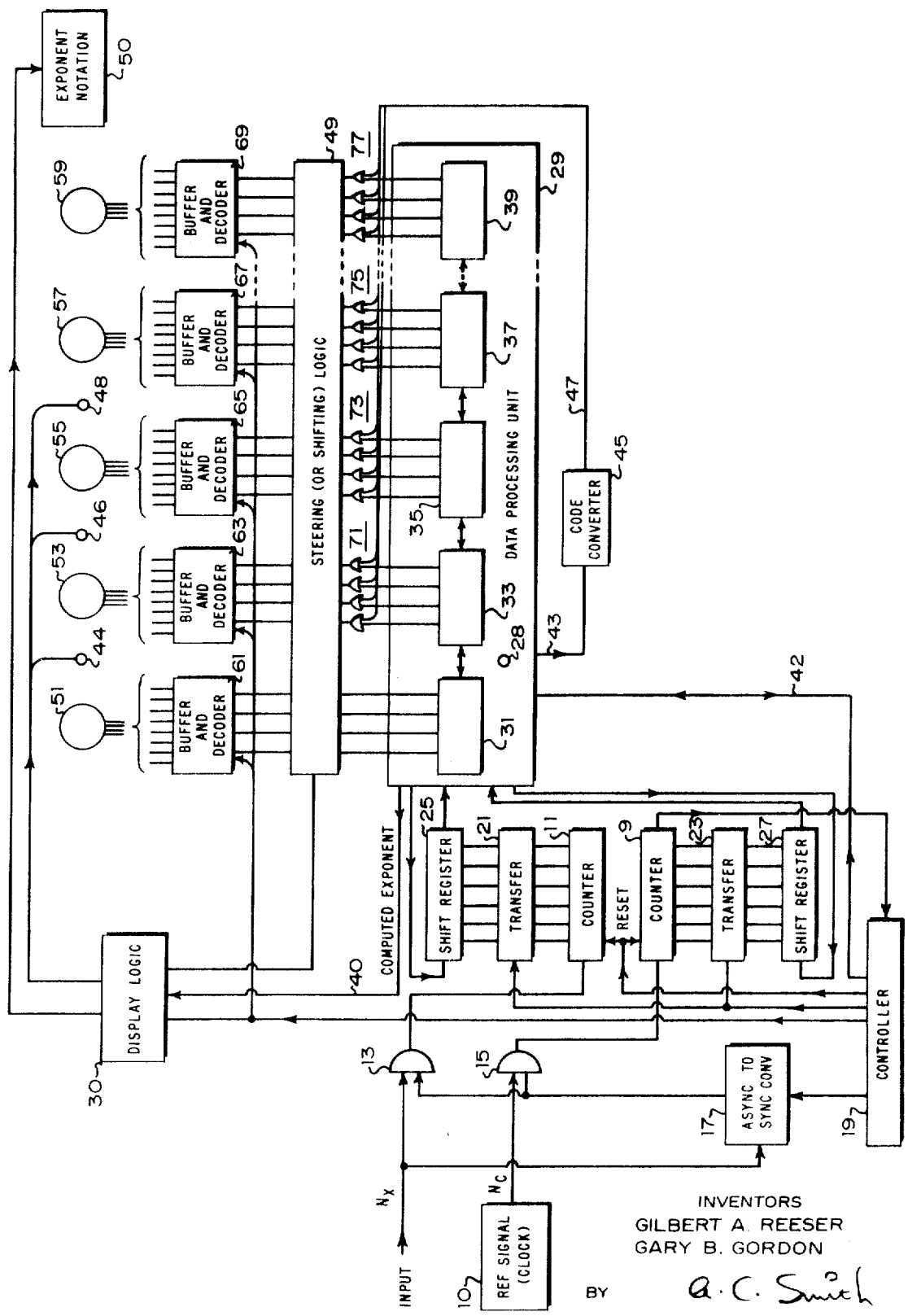

DISPLAY BLANKING APPARATUS

BACKGROUND OF THE INVENTION

Certain known logic circuits are used to blank out the display of nonsignificant zeros to the left of a decimal point in order to reduce the number of display digits. Circuits of this type are described in the literature (see, for example, U.S. Pat. application Ser. No. 693,619 entitled "An Electronic Counter in Which the Display of Nonsignificant Digits is Blanked," filed on Dec. 26, 1967, by A. Bagley et al.).

In the arithmetic computation of digital data, the computed answer commonly includes many more significant digits to the right of the decimal point than the input digital data originally contained. When the results of arithmetic computations involving real-time measurements are to be displayed, such a display may contain a number of significant digits which exceeds the number of digits required to display the computed answer to the degree of accuracy with which the real-time measurement can be made. Each of the excess display digits thus provides inaccurate information that only tends to introduce unnecessary confusion in the displayed information.

SUMMARY OF THE INVENTION

In accordance with the illustrated embodiment of the present invention, information about the basic accuracy with which a measurement can be performed is used selectively to blank less significant display digits to the right of a decimal point which are representative of information with greater accuracy than the accuracy with which the measurement can be performed.

DESCRIPTION OF THE DRAWING AND PREFERRED EMBODIMENT

The drawing is a block schematic diagram of one embodiment of the display-blanking apparatus of the present invention. A real-time measurement, for example, of unknown signal frequency may be performed by counting in counter 9 the number of pulses of a reference signal $N_c$ from source 10 that occur in a given gate period while counting in counter 11 during the same gate period the number of occurrences of pulses $N_x$ representative of the unknown signal frequency. A pair of gates 13, 15 may be connected at the inputs of the counters 9 and 11 to control the counting during a gate period determined by the converter 17 that is connected to the gates. This converter 17 supplies gate-enabling and disabling pulses to the gates 13, 15 in synchronism with the unknown signal frequency in order to reduce the sources of count ambiguity that occur at the start and end of a gate-period counting interval. The converter 17 may be armed to enable and disable the gates 13, 15 in synchronism with the unknown signal frequency in response to arming signals applied thereto by the controller 19.

The counts of pulses contained in the counters 9 and 11 after the gate period may then be arithmetically processed to provide an indication of the unknown signal directly in units of frequency or in units of signal period. For this reason, the count information in counters 9 and 11 is transferred through gates 21 and 23 to the corresponding shift registers 25 and 27 during a brief transfer interval at the end of the gate period. The counters 9 and 11 may then be reset by controller 19 to perform subsequent measurements while the count information in shift registers 25, 27 is processed to provide an indication of the desired computation. The arithmetic processing of count information in this form is described in the copending U.S. Pat. application Ser. No. 793,114 entitled "Counting Apparatus and Method," filed on Jan. 22, 1969 by A. Bagley et al.

The count information stored in the registers 25 and 27 may be circulated through data processing unit 29 to form in a conventional manner the quotient of one of the count numbers divided by the other of the count numbers. An example of the data processing unit 29 is described in U.S. Pat. No. 3,388,385. The resulting quotient may be produced in floating point notation in the form of mantissa and exponent information with respect to an assumed radix or decimal point 28. In this notation form, the mantissa digit may be stored in coded form in flip-flop or other logic output stages 31—39 and the computed exponent may appear in coded form on line 40. In addition, at the completion of the computation which yields the quotient of the two count numbers, the processing unit 29 applies an end-of-computation signal via line 42 to the controller 19 which then controls the display of the mantissa and exponent information.

The controller 19 responds to the end-of-computation signal on line 42 received from processing unit 29 and actuates the display logic 30 to provide an output indication of the computed mantissa digits presented in stages 31—39 with proper notation of the exponent information on line 40. Display logic 30 triggers the steering (or shifting) logic 49 to transfer the mantissa digit information to the appropriate buffer and decoder stages 61—69. In one embodiment, the logic unit 49 provides serial entry of the data in stages 61—69 and introduces selective delay to shift the digits from the positions they appear in in stages 31—39. In another embodiment the logic unit 49 provides parallel entry of the data from stages 31—39 and steers the digit information from a given stage 31—39 to a selected one of the buffer and decoder units 61—69. An example of steering logic 49 is described in U.S. Pat. No. 3,311,896. At the same time, the display logic 30 energizes the appropriate decimal point indicator 44, 46 or 48 and actuates the circuit 50 to provide an indication of the proper exponent notation. The buffer and decoder units 61—69 store the coded digit signals after transfer thereto from the processing unit 29, thereby permitting the processing unit 29 to operate in a new cycle to compute the next arithmetic combination of pulse counts in counters 9 and 11. These units 61—69 also decode the coded mantissa-digit signals to control the appropriate digits to be displayed by the digit display units 51—59. An example of buffer/decoders 61—69 is described in U.S. Pat. Nos. 3,165,633 and 3,328,564.

In accordance with the illustrated embodiment of the present invention, only selected ones of the more significant mantissa digits thus computed may be displayed while other less significant ones may be blanked to the right of the displayed decimal point 44, 46, 48. The number of significant digits to be displayed is related to the basic accuracy with which the count of pulses was taken, as shown in the following example: assume that the frequency stability of the clock or reference signal from source 10 is known to be within about 1 part in $10^{11}$ at a frequency of about 10 gigaHertz and that the count accuracy of the count taken of the reference pulses by counter 9 is plus or minus one count. The accuracy of the count number of clock pulses taken by counter 9 is thus within about 1 part in $10^{11}$ ±1 count. Also, assume that through synchronization of the gates 13 and 15 to the unknown pulse $N_x$, as previously described, the accuracy of the count number of the unknown pulses taken by counter 11 exceeds the accuracy which counter 9 produces the count number of clock pulses. Then, it should be noted that the eleventh-place digit of the displayed computed count numbers may be inaccurate by ±10 percent (i.e. ±1 count in 10 digits) and that the twelfth- and succeeding-place digits are successive orders of magnitude more inaccurate. However, since such factors as clock pulse stability, and synchronization jitter, and the like, are relatively fixed factors which are associated with a particular design, the display digits need not be provided (i.e. be permanently blanked) beyond the eleventh digit in the present example (where greater last-place accuracy than ±10 percent is always required, the display may be permanently blanked beyond the tenth digit). Blanking of selected ones of the less significant digit places which are provided thus varies as a function of the length of the gate period during which the reference count number may be taken. Thus, for a gate period that is selected to be about 0.5 microseconds long (it should be noted that the actual gate time will be determined by the occurrences of unknown signals that are separated by approximately the selected 0.5 microsecond period), the clock or reference signal counter 9 will thus count about 5,000 pulses. The number of digits in this count number is four and this count is accurate to within the stability of the reference source plus or minus one count. Thus, when this count number is algebraically combined with the count number of unknown pulses taken by counter 11 during the same gate period, the computed value cannot be more accurate than plus or minus one count in counter 9 and plus or minus one count in counter 11. Accordingly, the data processing unit 29 detects the number of digits in the count number from counter 9 that circulates in shift register 27 and produces an output, say, in binary coded form, on line 43 that is indicative of the number of digits in reference or clock count number for the chosen gate period. This number of digits in the count number of pulses taken by the counter 9 of reference pulses may be used to determine the same number of digits displayed by the indicators 51—59 since the magnitude of the count number of reference pulses determines the overall degree of accuracy with which the quotient (or other algebraic combination of) count numbers should be displayed. In another embodiment of the present invention, greater digit display accuracy can always be assured by reducing the number of digits to be displayed (i.e. the number of digits in the count number of reference pulses) by the number of digits in the value of the count resolution (i.e. the ± count resolution). Thus, a count resolution of plus or minus 5 counts means that the last-place digit is accurate only to within 50 percent of the actual value and therefore an additional number of less significant digits are blanked. (Here, one fewer digits will be displayed because the count resolution of 5 counts has one digit. In another example, if the count resolution is plus or minus 17 counts, then two fewer digits will be displayed.) In this embodiment, the signal on line 43 is indicative of the number of digits in the clock count number less the number of digits in the count resolution value. It should be noted that a longer selected gate period, say 5 milliseconds, produces a larger reference or clock count in counter 9 of about 50,000,000, which count taken over a longer error-averaging period may be regarded as being accurate to within about 2 parts in $10^8$.

The output on line 43 is thus indicative of the basic accuracy with which the reference count may be taken. This output on line 43 is applied to the code converter 45 which generates signals on line 47 for inhibiting selected ones of the display digits 51—59. For logic unit 49 that produces parallel entry of coded mantissa-digit signals to the buffer and decoder units 61—69, the code converter 45 produces a blanking signal on selected conductors of line 47 which connect to the groups of the digit blanking gates 71—77. In this embodiment, each of the decoder units 61—69 is adapted to produce no digit-display signal in response to an applied 4-line coded signal that is representative of a digit other than one of the digits 0—9. Decoder units of this type are described in the literature (see, for example, the previously cited patent application Ser. No. 693,619). Thus, a logic "1" signal is applied to each of the gates in a selected group or groups 71—77 to supply a logic "1111" binary signal for steering to selected buffer and decoder stages 61—69. In another embodiment of the invention where logic unit 49 provides serial entry of mantissa-digit signals to the buffer and decoder units 61—69, the code converter 45 produces a logic "1" signal on line 47 at a selected time and only one group of transfer gates 71 may be required, which group of gates is then activated at such selected time during the serial entry of the mantissa-digit signals to supply a logic "1111" binary signal to a selected one (and thereafter to following ones) of the decoder units 63. In each of these embodiments, then, selected ones of the buffer and decoder units 61—69 fail to activate the corresponding display units 51—59 to the right of a decimal point 44, 46, 48. In still another embodiment, the code converter 45 produces inhibit signals on selected ones of the lines 47 for application to inhibit gates associated with each of the display units 53—59. The display digits thus "dropped" are only representative of greater decimal-place accuracy than the accuracy with which the measurement was originally made and, though no useful information is lost, the displayed information is less complicated and is therefore easier to observe and understand.

We claim:

1. Digit display apparatus for blanking selected less significant zero and nonzero display digits, the apparatus comprising:
   processing means for processing a pair of digital data signals to produce an output digit signal as the algebraic combination of digital data signals introduced therein;
   circuit means for introducing first and second digital data signals representing plural numbers of data digits into said processing means for processing therein to produce an output digit signal;
   display means for producing an output indication of a multidigit number;
   display control means having a control input and being coupled to said processing means to receive the output digit signal therefrom for actuating the display means to produce an output indication representative of said output digit signal which includes a number of digits selected by signal applied to said control input; and
   auxiliary means responsive to the number of data digits represented by at least one of a pair of digital data signals applied to the processing means for applying to the control input of the display control means a control signal which is representative of said number of data digits for actuating the display means to produce an output indication only of a selected number which is less than all of the digits represented by the output digit signal and which is related to said number of data digits.

2. Digit display apparatus as in claim 1 wherein:
   said circuit means includes first and second counters for counting the number of pulses applied thereto to produce said digital data signals which are indications of the number of pulses counted by said counters;
   gate means are adapted to receive pulses from pulse sources and are coupled to said first and second counters for applying received pulses to said counters for a selected pulse counting intervals; and
   said auxiliary means are responsive to the number of digits in the number count of pulses taken by one of said counters during a selected pulse counting interval for applying to the control input of said display control means a control signal which is representative of said number of digits in said number count for actuating the display means to produce an output indication only of a selected number of the digits represented by said output digit signal which is related to said number of digits in said number count of pulses.

3. Digit display apparatus as in claim 2 wherein:
   one of said pulse sources is a source of reference pulses which recur at a standard frequency;
   the other of said pulse sources is a source of pulses, the recurrence period or repetition frequency of which is to be measured;
   said selected pulse counting interval is the interval between a selected number of recurrences of the pulses to be measured;
   the first counter is coupled through said gate means to receive said references pulses;
   said first counter counts the reference pulses during said selected pulse counting period with a selected number value of count resolution; and
   said auxiliary means responds to this number of digits in said first counter and to the number of digits in the number value of the count resolution of said first counter to produce said control signal for actuating said display means to produce an output indication representative of said output digit signal and including a number of digits equal to the algebraic combination of the number of digits in said number counter and the number of digits in said number value.